United States Patent
Ladang et al.

(10) Patent No.: US 6,432,335 B1
(45) Date of Patent: *Aug. 13, 2002

(54) PROCESS FOR FLEXIBLE CELLULAR MATERIAL PREPARATION

(75) Inventors: Michel Ladang, Battice; Marc Mertens, Spa; Dominique Petit, Blegny, all of (BE)

(73) Assignee: Norton Performance Plastics, Chaineux (BE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/232,905

(22) Filed: Jan. 19, 1999

(30) Foreign Application Priority Data

Jan. 16, 1998 (FR) .................................. 98 00462

(51) Int. Cl.⁷ .................................................. B29C 44/20
(52) U.S. Cl. .......................................... 264/50; 521/110
(58) Field of Search ........................... 521/79, 110, 111; 264/50

(56) References Cited

U.S. PATENT DOCUMENTS

| | | | | |
|---|---|---|---|---|
| 3,097,176 A | * | 7/1963 | Bender et al. | 521/110 |
| 3,149,083 A | * | 9/1964 | Gmitter | 521/110 |
| 3,577,362 A | * | 5/1971 | Tamura et al. | 521/111 |
| 3,577,390 A | * | 5/1971 | Owen et al. | 521/111 |
| 4,242,464 A | * | 12/1980 | Boutle | 264/45.8 |
| 4,298,707 A | * | 11/1981 | Hergenrother et al. | 521/95 |
| 4,367,302 A | * | 1/1983 | LeRoy et al. | 524/104 |
| 4,603,076 A | * | 7/1986 | Bowditch et al. | 428/246 |
| 4,719,244 A | * | 1/1988 | Muller et al. | 521/115 |
| 4,792,575 A | * | 12/1988 | Takao et al. | 521/157 |
| 5,272,204 A | * | 12/1993 | Akimoto et al. | 524/700 |
| 5,763,502 A | * | 6/1998 | Barker et al. | 264/50 |

* cited by examiner

Primary Examiner—Allan R. Kuhns
(74) Attorney, Agent, or Firm—Oblon, Spivak, McClelland, Maier & Neustadt, P.C.

(57) ABSTRACT

A flexible cellular material can be made by extruding a composition containing a polyurethane prepolymer, where the prepolymer has end groups selected from the group consisting of isocyanate end groups and trialkoxysilyl end groups, and the prepolymer is self-crosslinkable with moisture. The flexible cellular material has an expanded or foamed polymer matrix.

16 Claims, 1 Drawing Sheet

PROCESS FOR FLEXIBLE CELLULAR MATERIAL PREPARATION

BACKGROUND OF THE INVENTION

1. Field of the Invention

The present invention relates to the field of flexible or supple materials made of expanded or foamed polymer which can be used in particular for the preparation of leaktight, insulation and/or damping components.

2. Description of the Background

In this field, synthetic materials in the form of foam or having a cellular structure, manufactured as a broad strip or as a strand, which is cut to the desired dimensions and which is applied to the corresponding surface via an adhesive layer, are known. A material widely used is PVC foam manufactured from a plastisol to which a foaming agent has been added. However, this is difficult to implement when the surface has a complex geometry. It can also take too long to carry out in the context of large scale mass production of parts.

For these applications, in particular in the automobile industry or in industries for the manufacture of various electrical devices, a technique has been developed for the production of a gasket foamed in situ or in place (formed in place foam gasket or foamed in place gasket—FIP) by deposition in place of a material with an appropriate viscosity which changes into a foam by crosslinking in the open air. The material can be applied into a groove, in a form or on a smooth surface in the case of thixotropic or three-dimensional systems.

A first alternative form of this technique uses, as the material to be deposited, a system with two components (two-component system) each of which are stored separately from one another and mixed in appropriate amounts just before application by devices for metering and mixing under reduced pressure. Two-component systems are known for forming silicone or polyurethane foams. This technique is disclosed in particular in EP-A-0,416,229.

A second alternative form of this technique eliminates the disadvantages related to metering and mixing at the time of use by using a so-called single component system: the material to be deposited is prepared in advance and is provided in a stable form which can be stored under an inert atmosphere until use.

A typical composition suited to this use is disclosed in EP-A-0,326,704. It comprises a first prepolymer component, which can self-crosslink with water, as an intimate mixture with a second noncrosslinked elastomer component, so as to constitute, after extrusion and crosslinking, a material of the interpenetrating polymer network type. Depending on the viscosity of the mixture and the treatment conditions, the extruded substance can form the foam spontaneously or the foaming can be obtained by virtue of a chemical or physical agent. An example of equipment suitable for extruding this substance in the presence of a foaming gas is disclosed in U.S. Pat. No. 4,405,063.

Although this technique relatively easily produces a foamed gasket having qualities which are sufficient for applications in sealing, insulation or others as mentioned above, it can be further improved in order to achieve improved performance.

SUMMARY OF THE INVENTION

An object of the present invention is to provide a composition of substances having an improved ability to foam which makes it possible in particular to obtain products of relatively low relative density with mechanical properties at least as good as those of known products.

This object, as well as others which will become apparent subsequently, are achieved by using, as extrudable composition, a single-component product comprising a single macromolecular constituent containing a polyurethane prepolymer comprising isocyanate or trialkoxysilyl end groups which is self-crosslinkable with moisture.

Against all expectation, the Inventors found that it is possible to form a satisfactory foamed product without resorting to an interpenetrating network structure according to EP-A-0,326,704, in which structure the elastomer component serves to impart to the material the elasticity necessary for its mechanical strength, while the crosslinkable component contributes the thermosetting nature to the material. On the one hand, a composition comprising only a thermosetting polyurethane prepolymer lends itself perfectly to the technique of extrusion in the presence of pressurized gas: it does not present any problem of a rheological nature at the outlet of the extrusion nozzle, and the composition forms, fairly rapidly and without sagging, a foam which virtually instantaneously acquires dimensional characteristics very similar to the definitive characteristics. The flexible cellular material may therefore not include a noncrosslinked elastomer component, or the only organic polymer in the flexible cellular material may be one or more polyurethanes. Likewise, the polyurethane prepolymer may be the sole organic polymer in the extrudable composition, or the extrudable composition may not include a second elastomeric polymer.

On the other hand, under optimum manufacturing conditions, a composition comprising only a polyurethane prepolymer forms a foam with a lower relative density than a composition additionally comprising at least one other macromolecular constituent. The same volume of foamed material is thus obtained with a reduced amount of substance. A substantial saving in substance is achieved while retaining mechanical characteristics, in particular flexibility characteristics, which are sufficient for applications such as leaktight or insulation seals.

DETAILED DESCRIPTION OF THE INVENTION

The present invention produces cellular materials for which the density (after crosslinking) is less than 300 kg/m$^3$, in particular on the order of 260 kg/m$^3$ or less, in particular on the order of 250 kg/m$^3$ or less, for example less than or equal to 200 kg/m$^3$.

The cellular material obtained is flexible with, advantageously, a substantially elastic behaviour. The material can generally have a compression set at room temperature of less than 25%, advantageously on the order of 15% or less, in particular of less than or equal to approximately 10%, for example on the order of 5% or less. A low compression set indicates a good ability of the material to withstand compression. The values indicated above are compatible with a lasting leaktight capability in the usual applications.

Furthermore, the material as a crosslinked foam generally exhibits a smooth skin and a relatively fine to very fine cellular structure, which indicate the ability of the single-component product to prevent the bubbles of gas from bursting at the free surface of the extruded substance while preventing the coalescence of the bubbles of gas within the material. These characteristics make the material entirely suited to applications in leaktightness and/or insulation.

The cellular structure is advantageously such that the cells have a dimension of less than 0.3 mm, preferably of less than 0.2 mm. Structures comprising cells with a very small dimension, for example with a size of less than 0.1 mm, are particularly advantageous. "Fine" describes a structure in which the cells have dimensions of between approximately 0.1 and 0.3 mm, and "very fine" describes a structure in which the cells have dimensions of between approximately 0.03 and 0.2 mm.

In addition, the Inventors have demonstrated the fact that the foaming increases as the polymer system of the single-component product exhibits, at the supramolecular level, a reduced number of phases. Preferably, the polyurethane prepolymer forming the macromolecular constituent of the single-component product is essentially single-phase.

"Essentially single-phase" means a polymer system in which the macromolecular chains are essentially miscible. This is in particular the case when the polyurethane prepolymer is a homopolymer, the macromolecular chains being arranged in a single, perfectly homogeneous phase. This can also be the case when the prepolymer is a random copolymer. This can still be the case when the prepolymer is a block or grafted copolymer in which the various blocks (derived from at least two distinct monomers) are miscible with one another, optionally in a specific range of relative proportions. The blocks are preferably completely miscible with one another, so that a single homogeneous phase is observed by microscopy, but they can also be arranged so that (at least) one acts as a "matrix", the other being finely dispersed in the first. The latter structure, which exhibits a single continuous polymer phase (the "matrix"), is covered by the meaning of "essentially single-phase" in the present invention.

In contrast, the expression "essentially single-phase" as used here excludes systems in which the macromolecular chains separate into at least two cocontinuous phases, that is to say divided into as many macroscopic domains.

Depending on the types of block desired, a person skilled in the art is in a position to determine, using simple microscopic observations and without undue experimentation, the fractions by mass to use in order to be in the corresponding chain miscibility range.

The polyurethane prepolymer is a noncrosslinked oligomer, preferably with a molecular weight of less than 20,000 g/mol, obtained by reaction between (i) at least one component of polyol or polyamine type and (ii) at least one polyisocyanate component, optionally followed by a reaction for protecting the end functional groups by a trialkoxysilane.

The reactant (i) is advantageously chosen from polyols and polyamines with a functionality at least equal to 2 having a backbone of polyester, polycaprolactone, polyether, polyolefin, in particular hydroxlyated EVA copolymer, saturated or unsaturated polybutadiene, polyisoprene or polydimethylsiloxane type.

The backbone is preferably of type:
aliphatic and/or aromatic polyester, preferably essentially aliphatic, derived in particular from aliphatic glycols, optionally diethylene glycol, and from aliphatic and/or aromatic acids; or
polyether, in particular poly(ethylene oxide) and/or poly (propylene oxide) or polytetrahydrofuran.

The polyol or polyamine component is advantageously an oligomer with a molecular mass of less than or equal to approximately 10,000 g/mol, preferably on the order of 500 to 4000 g/mol, in particular from 1500 to 3500 g/mol. Its functionality is preferably on the order of 2 or more, in particular on the order of 2 to 2.5.

Moreover, the reactant (ii) can be chosen from simple molecules, in particular aromatic molecules, carrying at least two isocyanate functional groups and oligomers (with a molecular mass which can be chosen within the ranges indicated above) comprising isocyanate end groups with a functionality at least equal to 2. The reactant advantageously comprises at least one polyisocyanate component with a functionality at least equal to 2 of low molecular weight chosen from para-phenylene diisocyanate, trans-1,4-cyclohexane diisocyanate, 3-isocyanatomethyl-3,3,5-trimethylcyclohexyl isocyanate, 1,5-naphthalene diisocyanate, 4,4'-methylenebis(phenyl isocyanate) (pure MDI), crude MDI, 2,4-toluene diisocyanate (2,4-TDI), 2,6-toluene diisocyanate (2,6-TDI) and their mixtures (for example, 80/20 TDI comprising 80% of 2,4-isomer or 65/35 TDI), and crude TDI (unpurified 80/20 TDI). Among these components, crude or pure MDI is very particularly preferred.

For the polyisocyanate component, the functionality is preferably on the order of 2 or more, in particular on the order of 2 to 2.8.

For the purpose of obtaining a material in which the polymer matrix is a system with few phases, it is advantageous to choose a polyisocyanate component comprising a non-oligomer backbone, that is to say a low molecular weight aliphatic or aromatic component in which the isocyanate groups are not bonded to a polymer backbone.

For the purpose of obtaining a single-phase system, it is very particularly advantageous to react a single type of polyol or polyamine component with a low molecular weight polyisocyanate component. "A single type" is understood to mean that the chains of the oligomer backbone of the component belong to a single polymer family, while optionally being able to combine several members of this family. For example, it is possible to use a polyetherdiol in which the polyether chains are composed exclusively of poly(propylene oxide) but also optionally a mixture of (poly(propylene oxide))diol and of (poly(ethylene oxide)) diol.

When use is made of an oligomer comprising isocyanate end groups, its chemical structure and/or its fraction by mass in the mixture are preferably chosen so that the macromolecular chains of the two components (i) and (ii) are miscible with one another.

The relative amounts of polyol/polyamine component (i) and of polyisocyanate component (ii) are chosen so as to allow the production of a stable polyurethane prepolymer exhibiting isocyanate end groups. The polyisocyanate excess is preferably chosen so that the molar ratio of the isocyanate groups NCO to the alcohol groups OH and/or amine groups $NH_2$ (NCO/OH+$NH_2$) is on the order of 2 to 3.5.

The reaction time and temperatures vary according to the components used, their determination for each specific case being well within the skill of a person skilled in the art, without undue experimentation.

A prepolymer comprising trialkoxysilyl end groups can be obtained from the reaction product of the components (i) and (ii) by subjecting this product to a reaction with a trialkoxysilylating agent. A trialkoxysilane capable of reacting with an NCO group can be a trialkoxyaminosilane, for example an aminopropyltrialkoxysilane, such as aminopropyltrimethoxysilane, or a trialkoxymercaptosilane. The prepolymers terminated by isocyanates are nevertheless preferred in so far as their self-crosslinking in the presence of water is much faster.

The cellular material according to the invention can be composed exclusively of polyurethane but its polymer matrix can also comprise a filler. Filler is generally understood to mean here a product which is neither soluble nor miscible in the polymer matrix, which is dispersible in the latter and which allows one or more properties or characteristics (mechanical or chemical properties, colour, production cost) of the final mixture to be improved. To this end, the extrudable single-component product can additionally comprise an organic or inorganic, particulate or pulverulent filler, for example calcium carbonate and/or carbon black. The single-component product can also comprise conventional additives, such as plasticizer, colorant, stabilizer, cell regulator, catalyst, and the like.

Another subject-matter of the invention is a stable composition which can be extruded in the presence of pressurized gas in order to form a flexible cellular material having an expanded or foamed polymer matrix, this composition comprising a macromolecular constituent, characterized in that the macromolecular constituent is a polyurethane prepolymer comprising isocyanate or trialkoxysilyl end groups which is self-crosslinkable with moisture. This type of composition generally has a fairly low viscosity which can in particular be less than 500 Pals at less than 60° C., which greatly facilitates shaping by extrusion. It is stable on storage under a dry atmosphere.

Another subject-matter of the invention is a process for the manufacture of a cellular material as described above. This process comprises:

preparing a single-component product of the above composition, optionally storing the single-component product away from moisture, in particular under a dry atmosphere or under vacuum, mixing the product with a pressurized gas in order to form an extrudable substance, extruding an amount of extrudable substance, crosslinking the extruded substance in a moist atmosphere.

The cellular material according to the invention is preferably manufactured in the form of a strip, panel, strand or pipe for a leaktight seal. It can be produced by direct extrusion over the surface provided for its application or else by extrusion in a mould carrying the negative impression of the surface in question and then transfer onto this surface.

Extrusion is understood to mean here, within the broad sense, a technique in which a substance in the fluid or viscous state is conveyed to an applicational orifice which we shall call a nozzle. This term does not restrict the invention to a technique for configuring the substance, the latter being free to adopt, at the outlet of the orifice, dimensions substantially different from those of the cross-section of the nozzle.

The gas can preferably be nitrogen, but also any other gas known for this purpose: air, carbon dioxide, n-pentane, and the like.

The moist crosslinking treatment can be carried out under conditions known to a person skilled in the art, for example in a temperature range from room temperature to approximately 80° C. in an atmosphere having a relative humidity on the order of 40 to 100%.

The crosslinking can be accompanied by a swelling of the material due to the release of $CO_2$ by the crosslinking reaction of the free isocyanate groups with the water. Generally, a high relative humidity promotes a high degree of swelling.

BRIEF DESCRIPTION OF THE DRAWINGS

Having generally described this invention, a further understanding can be obtained by reference to certain specific examples which are provided herein for purposes of illustration only and are not intended to be limiting unless otherwise specified.

EXAMPLES

Example 1

Preparation of the Single-component Product

Figure 1:
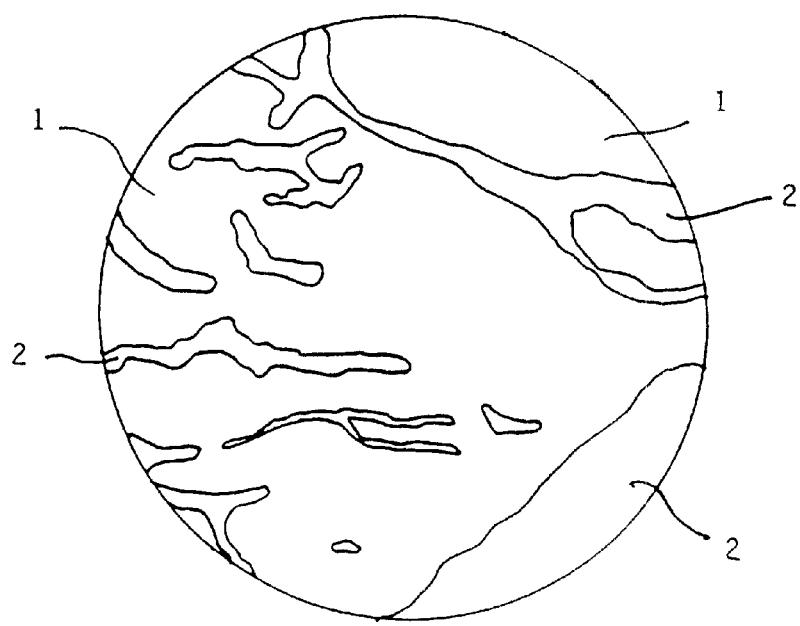
FIG. 1 diagrammatically illustrates the structure observed under an optical microscope of a first single-component product before shaping according to the invention.

A polyurethane prepolymer is prepared by reacting a polyesterdiol 1 with 4,4'-methylenebis(phenyl isocyanate) (MDI). The polyesterdiol used is sold under the trade name DYNACOLL® by the company HULS; it is characterized by an OH number of approximately 31.2 (expressed as mg of KOH per gram of product) and a molecular mass of approximately 3500 g/mol. The MDI used is crude MDI having a functionality of 2.7 and a level of isocyanate groups NCO of 31% (as % by weight of NCO equivalents per gram of product).

11.5 kg of DYNACOLL® are placed in a mixer with flushing of the surface with dry air and heated to a temperature of 80° C. approximately with optional addition of a stabilizer. 2.7 kg of MDI are subsequently added, so that the initial NCO/OH ratio is on the order of 3.2, and the mixture is homogenized with moderate stirring.

The progress of the reaction is followed by periodically measuring the content of residual isocyanate groups in reaction mixture samples withdrawn at regular intervals. The NCO groups are quantitatively determined by back titrating an n-butylamine solution (0.5M) with a hydrochloric acid solution (0.5M).

When the theoretical NCO percentage is reached, a catalyst of the amine type is added in the proportion of approximately 0.05% by weight of the product, and a colorant, such as carbon black, is optionally added. After homogenizing with vigorous stirring, the product is rapidly packaged under a dry atmosphere. It can be stored in this form for a period of 6 months at room temperature in hermetically sealed receptacles (such as drums).

The product is observed under an optical microscope in order to check the phase number of the polymer system thus formed. It is found that the prepolymer is single-phase, as a consequence of the use of a single type of diol and of a non-oligomer polyisocyanate.

Manufacture of a Cellular Material

The single-component product prepared above was extruded in the presence of pressurized nitrogen in a foaming machine of the type disclosed in EP-A-0,654,297, comprising:
- a store of thermoplastic product and means for heating the product to its plasticity temperature,
- a mixing device equipped with a pipe for conveying viscous product and with a pipe for conveying pressurized nitrogen, and
- a pipe for conveying extrudable substance equipped with an extrusion nozzle.

Under the effect of the temperature and of the pressure in the chamber of the mixing device, the nitrogen dissolves in the single-component product. At the outlet of the extrusion nozzle, the substance is exposed to atmospheric pressure, bringing about the release of the nitrogen by reduction in pressure with the formation of bubbles of gas which expand the polymer.

The extrusion conditions were adjusted in order to form an extruded strand with a diameter of approximately 6 mm. The nozzle is preferably heated, so as to maintain the viscosity of the substance at a desired value at the outlet of the extrusion channel.

With the single-component product of Example 1, an instantaneous foaming is observed at the nozzle outlet, indicating the excellent ability of the product to expand according to this technique. The extruded strand in addition exhibits a high dimensional stability in the non-crosslinked state: sagging is not observed, nor other significant deformations, which shows that the composition of the extruded substance has satisfactory rheological properties, despite the absence of an elastomer.

The extrusion operation is followed by a stage of moist crosslinking of the extruded strand under two types of conditions: at room temperature and relative humidity on the order of 50 to 60% (RT conditions) or else in a warm atmosphere, for example at a temperature of approximately 55° C. and relative humidity on the order of 85% (HHB conditions).

Characterization of the Cellular Material

After crosslinking, the relative density of the strand is measured by a method known per se. It is 210 kg/m³ for the material crosslinked under the RT conditions, and 200 kg/m³ for the material crosslinked under the HHB conditions.

The product is also observed under an optical microscope in order to define the cellular structure of the foamed strand. The mean diameter of the smallest bubbles and of the biggest bubbles is measured. The cellular structure is defined according to the following scale:

TABLE 1

| Designation | Extreme dimensions of the cells (mm) |
|---|---|
| FF | 0.03 → 0.2 |
| F | 0.1 → 0.3 |
| M | 0.15 → 0.5 |
| C | 0.17 → 1.7 |
| CC | 0.8 → 2 |

It is found that the strand of Example 1 has a very fine (FF) cellular structure. Moreover, the compression set (Cset) is measured in the following way: the thickness $T_0$ of a sample of strand after crosslinking is measured using a digital slide gauge. The sample is compressed by 25% in the direction of the thickness, to a thickness $T_i=0.75 \times T_0$. The compression is kept constant for 22 hours at a temperature of 70±2° C., the sample is then released and it is left standing for 24 hours at room temperature. The final thickness $T_F$ of the sample is then measured. The compression set of the strand is given by the following relationship:

$$Cset \text{ (in \%)} = \frac{T_0 - T_F}{T_0 - T_i} \times 100$$

The high temperature makes it possible to obtain, in 22 hours, a value indicative of a compression at room temperature over a period which would be expressed in weeks. The following was measured: Cset=15%.

Example 2

Another single-component product is prepared by reacting another polyesterdiol with MDI. This polyesterdiol 2 is denoted under the name of B-ESTER®, sold by the company POLYOLCHIMICA; it is characterized by an OH number of 29.7 and a molecular mass on the order of 3500 g/mol.

13.2 kg of B-ESTER® are reacted with 3.04 kg of MDI, so that the NCO/OH ratio is on the order of 3.2, under the same conditions as in Example 1. The polymer system formed is single-phase, since only a single type of diol was used. This product is extruded as a foamed strand as described in Example 1.

Example 3

Another single-component product is prepared, this time by reacting a polyetherdiol with MDI. The polyetherdiol used is sold under the trade name LUPRANOL® by the company BASF; it is characterized by an OH number of 56 and a molecular mass on the order of 2000 g/mol.

14.1 kg of LUPRANOL® are reacted with 5.14 kg of MDI, so that the NCO/OH ratio is on the order of 2.7, under conditions similar to those of Example 1. The polymer system formed is single-phase, since only a single type of diol was used. This product is extruded as a foamed strand as described in Example 1.

Example 4

Another single-component product is prepared, this time by reacting the polyesterdiol 2 (B-ESTER®) with pure MDI.

The pure MDI is characterized by a functionality exactly equal to 2 and an NCO level of 11.7%.

14 kg of B-ESTER® are reacted with 2.96 kg of MDI, so that the NCO/OH ratio is on the order of 3.2, under conditions similar to those of Example 1. The polymer system formed is single-phase, since only a single type of diol was used. This product is extruded as a foamed strand as described in Example 1.

Example 5

Another single-component product is prepared by reacting the polyesterdiol 2 (B-ESTER®), comprising calcium carbonate as a filler, with crude MDI.

13 kg of B-ESTER®, mixed with 1.4 kg of calcium carbonate, are reacted with 3 kg of crude MDI, so that the NCO/OH ratio is on the order of 3.2, under conditions similar to those of Example 1. The polymer system formed is single-phase, since only a single type of diol was used. This product is extruded as a foamed strand as described in Example 1.

Example 6

Another single-component product is prepared by reacting a mixture of two polyesterdiols (1 and 2) with MDI.

A mixture of 7 kg of B-ESTER® and of 7 kg of DYNACOLL® is reacted with 3.29 kg of crude MDI, so that the NCO/OH ratio is on the order of 3.2, under conditions similar to those of Example 1.

Although the two dials used are immiscible in the diol state, the polyester chains are miscible and form a single homogeneous phase in the prepolymer thus obtained. This product is extruded as a foamed strand as described in Example 1.

Example 7

Another single-component product is prepared by reacting a mixture of polyetherdiol and of polyesterdiol 2 (ratio by mass 20/80) with MDI.

A mixture of 2.49 kg of LUPRANOL® and of 10 kg of B-ESTER® is reacted with 3.16 kg of crude MDI, so that the NCO/OH ratio is on the order of 3, under conditions similar to those of Example 1.

The two diols used are here of different types (ester/ether). In the proportions chosen, the polyester and polyether chains are immiscible in the prepolymer and are arranged in two cocontinuous macroscopic phases. This structure is illustrated in FIG. 1, where the two cocontinuous phases are denoted by reference numbers 1 and 2. This product is extruded as a foamed strand as described in Example 1.

Example 8

Another single-component product is prepared by reacting a mixture of polyetherdiol and of polyesterdiol 2 (ratio by mass 80/20) with MDI.

A mixture of 10.2 kg of LUPRANOL® and of 2.5 kg of B-ESTER® is reacted with 4.28 kg of crude MDI, so that the NCO/OH ratio is on the order of 2.75, under conditions similar to those of Example 1.

Figure 2:
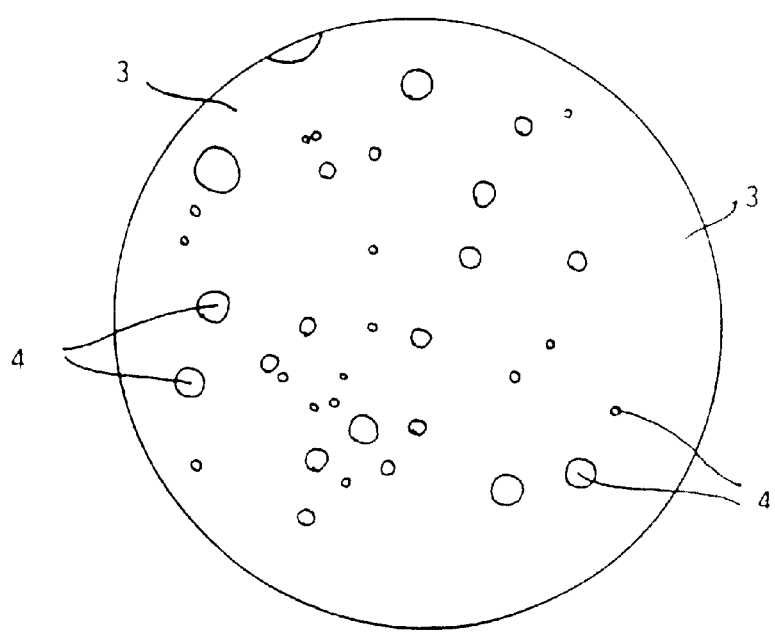
FIG. 2 diagrammatically illustrates the structure observed under an optical microscope of a second single-component product before shaping according to the invention.

Here again, the two diols are of different types but they are used in proportions such that the polyester and polyether chains appear as miscible in the prepolymer. The structure observed is represented diagrammatically in FIG. 2: it is composed of a continuous phase 3 within which are distinguished inclusions 4 in the form of fine dispersed droplets (FIG. 2 corresponds to observation of the prepolymer under an optical microscope with the same magnification factor as in FIG. 1).

This structure corresponds to the definition of an essentially (or overall) single-phase polymer system given in the present application. This product is extruded as a foamed strand as described in Example 1.

Example 9

Another single-component product is prepared by reacting a mixture of polyetherdiol and of polyesterdiol 2 (ratio by mass 50/50) with MDI.

A mixture of 6.88 kg of LUPRANOL® and of 6.88 kg of B-ESTER® is reacted with 4.1 kg of crude MDI, so that the NCO/OH ratio is on the order of 2.8, under conditions similar to those of Example 1.

As in Example 7, the two diols are used here in proportions such that the polyester and polyether chains are immiscible in the prepolymer. This product is extruded as a foamed strand as described in Example 1.

Example 10

Another single-component product is prepared by reacting polyetherdiol with a polyisocyanate comprising a polyether backbone. It is a polyether prepolymer having isocyanate end groups sold under the trade name LUPRANAT® MP 130 by the company BASF, characterized by an NCO level of approximately 12%, a molecular mass of 770 and an isocyanate functionality of 2.2.

8.5 kg of LUPRANOL® are reacted with 8.22 kg of polyether isocyanate, so that the NCO/OH ratio is on the order of 3.2, under conditions similar to those of Example 1.

As the polyisocyanate oligomer has a polyether backbone, the oligomer chains of the polyol and polyisocyanate components are compatible and form a single-phase prepolymer product. This product is extruded as a foamed strand as described in Example 1.

Example 11

Another single-component product is prepared by reacting polyesterdiol 2 with the polyether isocyanate of the preceding example.

10.5 kg of B-ESTER® are reacted with 6.38 kg of polyether isocyanate, so that the NCO/OH ratio is on the order of 3.2, under the same conditions as in Example 1. The system obtained shows two phases when observed optically. This product is extruded as a foamed strand as described in Example 1.

Example 12

Another single-component product is prepared by reacting another polyesterdiol 1 with the polyether isocyanate of Example 11.

10 kg of DYNACOLL® are reacted with 6.39 kg of polyether isocyanate, so that the NCO/OH ratio is on the order of 3.2, under the same conditions as in Example 1. The system obtained shows two phases when observed optically. This product is extruded as a foamed strand as described in Example 1.

Example 13

Another single-component product is prepared by reacting a polyisoprene oligomer polyol component with MDI.

14 kg of polyisoprenediol sold by the company ATO, characterized by an OH number of 32 and a functionality of 2.1, are reacted with 3.7 kg of pure MDI, so that the NCO/OH ratio is on the order of 2.45. This product is extruded as a foamed strand as described in Example 1.

Comparative Example 1

The preparation is carried out of a single component product according to the prior art, known from EP-A-0,326,704, based on a mixture of:

(a) a polyurethane prepolymer obtained by the reaction of a polyesterdiol of the DYNACOLL® type with a polyether prepolymer having isocyanate end groups; and (b) a styrene-butadiene-styrene elastomer.

The polymer system obtained forms four different macroscopic phases or domains, two of which correspond to the SBS elastomer. This product is extruded as a foamed strand as described in Example 1.

The characteristics of the materials of Examples 1 to 13 and of Comparative Example 1 are collated in Table 2 below, in which the speed of the foaming at the outlet of the extrusion nozzle has also been defined with the following grades:

| | |
|---|---|
| I | instantaneous |
| F | fast |
| S | slow |

The results set out in Table 2 show that, for a given type of oligomer chain, the foaming improves (low relative density and/or fine cellular structure) as the number of phases decreases. More particularly, the finest cellular structures are obtained for single-phase systems, the systems comprising a homogeneous phase made of a first type of polymer chain with another type of polymer chain forming fine inclusions being less preferred from this viewpoint.

The preceding examples describe compositions comprising specific systems crosslinking by isocyanate groups. The invention is in no way limited to these specific embodiments and other materials can be prepared from single-component products specifically formulated on the basis of the teaching of the general description of the invention for the purpose of obtaining properties suited to each specific application.

Obviously, additional modifications and variations of the present invention are possible in light of the above teachings. It is therefore to be understood that within the scope of the appended claims, the invention may be practiced otherwise than as specifically described herein.

The priority document of the present application, French patent application No. 98 00462, filed Jan. 16, 1998, is hereby incorporated by reference.

What is claimed is:

1. A method of making a flexible cellular material, the method comprising mixing a pressurized gas with a composition comprising a macromolecular constituent to form a substance;

extruding the substance; and crosslinking the extruded substance in a moist atmosphere to form the flexible cellular material, wherein the macromolecular constituent is a polyurethane prepolymer comprising end groups selected from the group consisting of isocyanate end groups and trialkoxysilyl end groups;

the prepolymer is self-crosslinkable with moisture; and the flexible cellular material does not include a non-crosslinked elastomer component.

2. The method of claim 1, wherein said prepolymer is essentially single-phase.

TABLE 2

| Example | Polyol component | Polyisocyanate component | Type of foaming | Number of organic phases | RT relative density (kg/m$^3$) | HHB relative density (kg/m$^3$) | Cellular structure | Compression set (Cset) (%) at 70° C. |
|---|---|---|---|---|---|---|---|---|
| 1 | Polyesterdiol 1 | Crude MDI | I | 1 | 210 | 200 | FF | 15 |
| 2 | Polyesterdiol 2 | Crude MDI | I | 1 | 220 | 200 | FF | 15 |
| 3 | Polyetherdiol | Crude MDI | — | 1 | 270 | 220 | F | 9 |
| 4 | Polyesterdiol 2 | Pure MDI | I | 1 | — | 145 | M | 45 |
| 5 | Polyesterdiol 2 + CaCO$_3$ | Crude MDI | F | 1 | 230 | 200 | FF | — |
| 6 | Polyesterdiol 1 + 2 | Crude MDI | I | 1 | 240 | 200 | FF | 11 |
| 7 | Polyetherdiol + Polyesterdiol 2 | Crude MDI | S | 2 | 255 | 235 | CC | — |
| 8 | Polyetherdiol + Polyesterdiol 2 | Crude MDI | F | ≅1 | 205 | 190 | M | 7 |
| 9 | Polyetherdiol + Polyesterdiol 2 | Crude MDI | — | 2 | 420 | 390 | C | — |
| 10 | Polyetherdiol | Polyether isocyanate | S | 1 | — | 250 | M | — |
| 11 | Polyesterdiol 2 | Polyether isocyanate | S | 2 | — | 245 | CC | — |
| 12 | Polyesterdiol 1 | Polyether isocyanate | S | 2 | — | 170 | C | — |
| 13 | Polyisoprene | Pure MDI | — | 1 | 340 | 295 | C | — |
| Comp. 1 | SBS + polyesterdiol/elastomer | Polyether isocyanate | — | 4 | 370 | — | C | — |

3. The method of claim 1, wherein said prepolymer is selected from the group consisting of a random copolymer; a homopolymer; and a block or grafted copolymer in which the various blocks are miscible with one another.

4. The method of claim 1, wherein said prepolymer is a non-crosslinked oligomer prepared by a reaction comprising:

reacting
- (i) at least one component selected from polyols and polyamines with a functionality of at least 2, said at least one component having a backbone selected from the group consisting of polyester, polycaprolactone, polyether, polyolefin, polybutadiene, polyisoprene and polydimethylsiloxane backbones; and
- (ii) at least one polyisocyanate selected from the group consisting of paraphenylene diisocyanate, trans-1,4-cyclohexane diisocyanate, 3-isocyanatomethyl-3,3,5-trimethylcyclohexyl isocyanate, 1,5-naphthalene diisocyanate, 4,4'-methylenebis(phenyl isocyanate), crude 4,4'-methylenebis(phenyl isocyanate), 2,4-toluene diisocyanate, 2,6-toluene diisocyanate, mixtures of 2,4-toluene diisocyanate and 2,6-toluene diisocyanate, crude toluene diisocyanate, and oligomers comprising isocyanate end groups;

wherein said at least one polyisocyanate has a functionality of at least 2.

5. The method of claim 4, wherein said (i) at least one component has a molecular mass of at most 10,000 g/mol.

6. The method of claim 4, wherein said (i) at least one component has a molecular mass of 500 to 4000 g/mol.

7. The method of claim 4, wherein said (i) at least one component and said (ii) at least one polyisocyanate are reacted in a molar ration of NCO:(OH+NH$_2$) of the 2:1 to 3.5:1.

8. The method of claim 4, wherein said prepolymer is prepared by a reaction further comprising modifying an oligomer obtained by the reaction between (i) and (ii) by reaction with a trialkoxysilylating agent.

9. The method of claim 1, wherein said prepolymer is a non-crosslinked oligomer prepared by a reaction comprising:

reacting
- (i) a first component selected from polyols and polyamines with a functionality of at least 2, said first component having a backbone selected from the group consisting of polyester, polycaprolactone, polyether, polyolefin, polybutadiene, polyisoprene and polydimethylsiloxane backbones; and
- (ii) at least one polyisocyanate selected from the group consisting of paraphenylene diisocyanate, trans-1,4-cyclohexane diisocyanate, 3-isocyanatomethyl-3,3,5-trimethylcyclohexyl isocyanate, 1,5-naphthalene diisocyanate, 4,4'-methylenebis(phenyl isocyanate), crude 4,4'-methylenebis(phenyl isocyanate), 2,4-toluene diisocyanate, 2,6-toluene diisocyanate, mixtures of 2,4-toluene diisocyanate and 2,6-toluene diisocyanate, and crude toluene diisocyanate;

wherein said at least one polyisocyanate has a functionality of at least 2.

10. The method of claim 1, wherein said composition further comprises a particulate or pulverulent filler.

11. The method of claim 1, wherein the pressurized gas comprises a gas selected from the group consisting of nitrogen, air, carbon dioxide, and n-pentane.

12. The method of claim 1, wherein
the mixing comprising dissolving the pressurized gas in the composition to form the substance; and
the extruding comprises reducing the pressure of the substance to release the pressurized gas from the composition.

13. The method of claim 1, wherein the crosslinking is carried out in a temperature range from room temperature to approximately 80° C.

14. The method of claim 1, wherein the crosslinking is carried out in a temperature range from room temperature to approximately 55° C.

15. The method of claim 1, wherein the crosslinking is carried out in an atmosphere having a relative humidity on the order of 40 to 100%.

16. The method of claim 1, wherein the crosslinking is carried out in an atmosphere having a relative humidity on the order of 50 to 85%.

* * * * *